United States Patent [19]

Greber, deceased et al.

[11] Patent Number: 5,378,799
[45] Date of Patent: Jan. 3, 1995

[54] HEAT-STABLE POLYIMIDES AND POLYAMIDE-IMIDES WITH MODIFIED BENZHYDROL STRUCTURAL ELEMENTS AND THEIR PREPARATION

[75] Inventors: Gerhard Greber, deceased, late of Bad Vöslau, Austria, by Johanna Greber, Peter Greber, heirs; Heinrich Gruber, Vienna; Marcel Sychra, Krems a.d.Donau, both of Austria

[73] Assignee: Chemie Linz GmbH, Austria

[21] Appl. No.: 119,650

[22] Filed: Sep. 13, 1993

[30] Foreign Application Priority Data

Sep. 17, 1992 [AT] Austria ................................ 1850/92

[51] Int. Cl.$^6$ ...................... C08G 69/26; C08G 73/10
[52] U.S. Cl. ...................................... 528/342; 528/170; 528/220; 528/229; 528/329.1; 528/331; 528/352; 528/353; 525/432; 525/436
[58] Field of Search ............ 528/342, 353, 331, 329.1, 528/170, 220, 229, 352; 525/432, 436

[56] References Cited

U.S. PATENT DOCUMENTS

| | | | |
|---|---|---|---|
| 3,654,227 | 4/1972 | Dine-Hart | 528/353 |
| 3,895,064 | 7/1975 | Brode et al. | 528/322 |
| 3,939,109 | 2/1976 | Barie, Jr. et al. | 528/353 |
| 4,645,821 | 2/1987 | Malinge et al. | 528/331 |
| 4,736,015 | 4/1988 | Rabilloud et al. | 528/353 |
| 4,987,218 | 1/1991 | Malinge et al. | 528/353 |
| 5,071,452 | 12/1991 | Avrillon et al. | 55/16 |
| 5,118,765 | 6/1992 | Greber et al. | 525/432 |
| 5,164,476 | 11/1992 | Greber et al. | 528/352 |

FOREIGN PATENT DOCUMENTS 0309338   3/1989   European Pat. Off.
475376  10/1975   U.S.S.R.

OTHER PUBLICATIONS

Chem. Abstract 111:174893 (1989)–Abstract of EP-A-1-0 309 338.
Chem. Abstract 83:194089 (1975)–Abstract of SU 475376.

Primary Examiner—John Kight, III
Assistant Examiner—P. Hampton-Hightower
Attorney, Agent, or Firm—Wenderoth, Lind & Ponack

[57] ABSTRACT

Heat-stable polyimides and polyamideimides with modified benzhydrol structural elements and a process of preparing thereof; wherein the polyimides and polyamideimides are obtained by reacting 3,3'4,4'-benzhydroltetracarboxylic acid dimethyl ester a) with only a diamine and then cyclized to give polyimides or b) with a diamine and with trimellitic, phthalic-or isophthalic acid (or the anhydrides, acid chlorides, anhydride chlorides or esters) and is then cyclized to give polyamideimides.

6 Claims, No Drawings

HEAT-STABLE POLYIMIDES AND POLYAMIDE-IMIDES WITH MODIFIED BENZHYDROL STRUCTURAL ELEMENTS AND THEIR PREPARATION

The invention relates to heat-stable polyimides and polyamide-imides with modified benzhydrol structural elements and their preparation.

The heat-stable polymers which have been industrially the most important to date are completely aromatic polyimides, which have extreme heat stabilities but are neither fusible nor soluble and therefore can be processed only with effort and expensively. The somewhat less heat-stable aromatic polyamides are likewise non-fusible and are insoluble or only slightly soluble in most organic solvents, so that their processing from solution to give fibers or films is associated with great difficulties. Their difficult processability makes these heat-stable polymers quite considerably more expensive and therefore excludes them from a number of interesting applications.

Attempts to develop fusible or more readily soluble heat-stable polymers, for example by incorporation of flexible chain elements ($-CH_2-$, $-O-$, $-S-$, $-CO-$) or sterically bulky groups have indeed been successful, but have so far always led to a—in most cases considerable—loss in heat stability. These products also include the polyamide-imides and polyester-imides, in which aromatic amide and imide or ester and imide groups are arranged randomly, which are usually soluble or have thermoplastic properties, but which likewise have a low heat stability (U.S. Pat. No. 3,895,064).

The actual solution to the problem in the field of heat-stable polymers thus still lies in the development of new products of high heat stability and at the same time good processability.

The object of the present invention was to develop new polyimides and polyamide-imides which are soluble and/or fusible in the cyclized form, while having an extreme heat stability, and are thus easy to process by conventional methods.

It has now been found that this object can be achieved with the aid of polyimides or polyamide-imides based on 3,3',4,4'-benzhydroltetracarboxylic acid dimethyl ester.

The present invention therefore relates to heat-stable polyimides and polyamide-imides of the formula I

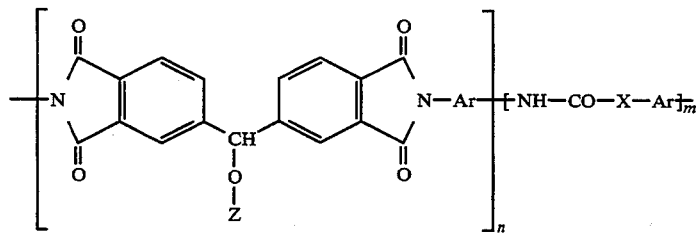

in which Ar denotes a divalent aromatic radical of the formula

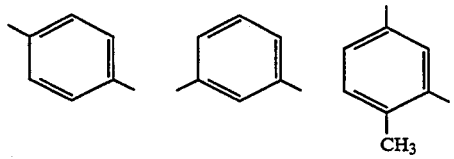

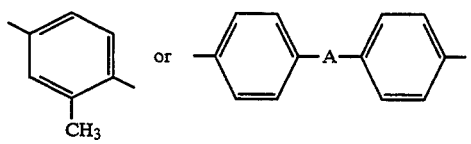

or mixtures thereof, wherein A represents $-CH_2-$, $-C(CH_3)_2-$, $-O-$, $-S-$, $-SO_2-$, $-SO-$, $-CO-$, $COO-$, $-CO-NH-$, $-NH-$, $-(N-alkyl)$ having 1 to 20 C atoms, $-N=N-$ or

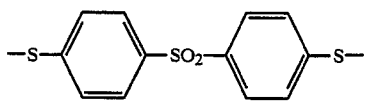

X denotes a radical of the formula

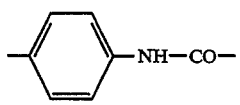

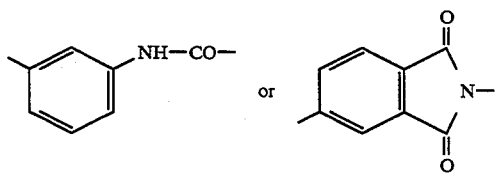

and Z is identical or different and denotes hydrogen, a straight-chain or branched, saturated or mono- or poly-unsaturated acyl radical having 2 to 20 C atoms or an aroyl radical having 7 to 20 C atoms, which can be optionally substituted by halogen, with the proviso that Z is not hydrogen alone, and n denotes an integer from 2 to 100 and m denotes an integer from 0 to 100, and, in the case where m>1, the radical ($-NH-CO-X-Ar-$) is randomly distributed.

In formula I, Ar denotes an aromatic radical, such as, for example, an m- or p-phenylene, 2,4-tolylene or 2,5-tolylene radical or a radical such as, for example, di-phenylenemethane, diphenylenepropane, diphenylene ether, diphenylene sulfone, diphenylene sulfide, diphenylenamine, diphenylene carboxide or 1,4-bis(-phenylenethio)diphenyl sulfone.

Z denotes hydrogen or a straight-chain or branched, saturated or mono- or polyunsaturated acyl radical having 2 to 20 C atoms, such as, for example, an acetyl, propionyl, butyryl, isobutyryl, valeryl, trimethylacetyl, hexanoyl, decanoyl, lauroyl, palmitoyl, stearoyl, acryloyl, methacryloyl, crotonoyl, linoloyl, linolenoyl or oleoyl radical.

Z can also represent an aroyl radical having 7 to 20 C atoms, which can optionally be substituted by halogen, such as chlorine or bromine, such as, for example, a benzoyl, o-chlorobenzoyl, p-chlorobenzoyl, m-chlorobenzoyl, o-bromobenzoyl, m-bromobenzoyl, p-bromobenzoyl or phenacetyl radical.

Preferred compounds of the formula I are those in which Ar denotes an m- or p-phenylene, 2,4-tolylene or 2,5-tolylene radical or a radical such as diphenylenemethane, diphenylenepropane, diphenylene ether, diphenylenamine or 1,4-bis(phenylenethio)diphenyl sulfone, or Z denotes hydrogen or a straight-chain or branched, saturated or mono- or polyunsaturated acyl radical having 2 to 18 C atoms, such as, for example, an acetyl, butyryl, isobutyryl, trimethylacetyl, lauroyl, palmitoyl, stearoyl, acryloyl, methacryloyl, crotonoyl, linoloyl or linolenoyl radical or an aroyl radical having 7 to 10 C atoms, such as a benzoyl or phenacetyl radical.

Particularly preferred are compounds of the formula I in which Ar denotes a p-phenylene or 2,4-tolylene radical or a radical such as diphenylenemethane, diphenylenepropane or 1,4-bis(phenylenethio)diphenyl sulfone, or Z represents an acetyl, lauroyl, acryloyl, methacryloyl, crotonyl, linoloyl, linolenoyl, benzoyl or phenacetyl radical.

The present invention furthermore relates to a process for the preparation of compounds of the formula I, which is characterized in that 3,3',4,4'-benzhydroltetracarboxylic acid dimethyl ester a) in the case where, in formula I, m=0, is reacted with diamines of the formula II

NH$_2$—Ar—NH$_2$ in which Ar is as defined above, in a diluent which is inert under the reaction conditions and the polyamide acid intermediately formed is cyclized chemically or thermally, or b) in the case where, in formula I, m>0, is reacted with diamines of the formula II, in which Ar is as defined above, and with trimellitic acid, phthalic acid or isophthalic acid or derivatives thereof and the polyamide-amide acid intermediately formed is cyclized chemically or thermally, and the polyimides or polyamide-imides thus obtained of the formula III or Z'—O—Z'  IVb in which Z' is identical or different and denotes a straight-chain or branched, saturated or mono- or polyunsaturated acyl radical having 2 to 20 C atoms or an aroyl radical having 7 to 20 C atoms, which can optionally be substituted by halogen, in a diluent which is inert under the reaction conditions to give the compounds of the formula I.

Diamines of the formula II which are employed are, for example, m- or p-phenylenediamine, 2,5- or 2,4-diaminotoluene, 4,4'-diaminodiphenylmethane, 4,4'-diaminodiphenylpropane, 4,4'-diaminodiphenyl ether, 4,4'-diaminodiphenyl sulfide, 4,4'-diaminodiphenyl sulfone, 4,4'-diaminodiphenylamine or 4,4'-bis(aminophenylthio)diphenyl sulfone.

Derivatives of trimellitic acid, phthalic acid or isophthalic acid are, for example, the anhydrides, anhydride chlorides, acid chlorides or esters.

Equivalent amounts of benzhydroltetracarboxylic acid dimethyl ester and diamine are preferably employed for the preparation of the polyimides of the formula III. A molar ratio of 1:1:2 (benzhydroltetracarboxylic acid dimethyl ester:trimellitic acid or phthalic acid or isophthalic acid or derivatives thereof:diamine) is preferably used for the preparation of the polyamideimides of the formula III.

The reaction to give the polyimides and polyamide-imides is preferably carried out in a manner which is known per se in diluents which are inert under the reaction conditions, such as, for example, N-methylpyrrolidone (NMP), dimethylformamide (DMF), dimethylacetamide (DMA), dimethyl sulfoxide (DMSO), tetramethylurea or hexamethylphosphoric acid triamide (HMP).

The diluent used is preferably NMP or DMF, particularly preferably NMP. The reaction here is carried out under a nitrogen atmosphere. The reaction temperature can be between 150° C. and 190° C., depending on the starting substances used and the desired end product, and the reaction time varies between 60 and 180 minutes, and is preferably 100 to 140 minutes.

The resulting polyamide acids or polyamide-amide acids are then cyclized to the known polyimides with benzhydrol structural elements by heating at 190° to 220° C. in a suitable solvent for 1 to 5 hours, preferably 3 to 4 hours, while stirring vigorously and with water being split off.

Subsequent esterification of the OH groups of the polyimides or polyamide-imides of the formula III with

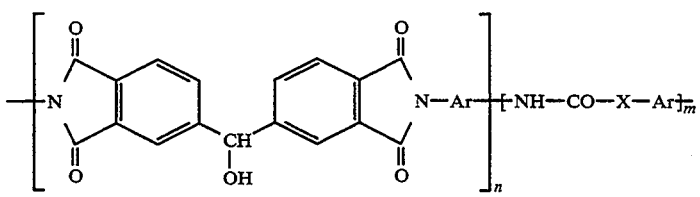

in which Ar, X, n and m are as defined above, are then reacted with acid chlorides or acid anhydrides of the formula Z'—Cl  IVa acid chlorides or acid anhydrides of the formula IVa or IVb is then carried out under a nitrogen atmosphere, if appropriate in a diluent which is inert under the reaction conditions.

Cyclization and subsequent esterification are preferably carried out in a one-pot reaction without isolation of the polyamide acid.

Suitable diluents are the abovementioned diluents, and NMP is preferably employed. In the case of esterification with polymerizable acid chlorides, such as acrylyl or methacrylyl chloride, a spatula-tip of an inhibitor, such as hydroquinone, is added to the reaction solution in order to prevent premature polymerization or crosslinking. If acid chlorides are used, it is expedient to add an equivalent amount of a suitable base, such as, for example, trimethylamine, triethylamine, dimethylaniline or pyridine, to the reaction mixture in order to bond the hydrochloric acid formed during the reaction. The reaction solution of polyimide or polyamide-imide and base is cooled to a temperature of about $-10°$ C. to $0°$ C., preferably to about $-6°$ C. to $-4°$ C., and an acid chloride, dissolved in a diluent which is inert under the reaction conditions, is then added dropwise in the space of 20 to 40 minutes. The reaction mixture thus obtained is cooled for about a further 50 to 80 minutes and then stirred at room temperature for a further 90 to 150 minutes. The amount of acid chloride or acid anhydride here depends on the desired percentage of OH group esterification and is about 0.1 to 1 mol of acid chloride or acid anhydride per mol of OH group. Preferably, however, an excess of 0.1 to 6 mol per mol of OH group is employed.

To isolate the polyimides or polyamide-imides of the formula I, the resulting reaction mixture is added dropwise to ice-water, if appropriate with addition of a spatula-tip of hydroquinone, while stirring vigorously, and the product which has precipitated is filtered off, washed with water, methanol and acetone and dried, for example by freeze drying.

The polyimides and polyamide-imides thus prepared are distinguished by particular properties, depending on the nature of the radical Z, such as, for example, by a good solubility in non-polar organic solvents and thus easier processability to fibers or films, or by low glass transition temperatures, which likewise simplify processability, or they have an improved heat stability, or they can be crosslinked more readily by light or heat.

EXAMPLE 1

Preparation of a polyimide (Ia) based on 3,3′,4,4′-benzhydroltetracarboxylic acid dimethyl ester 18.1 g (46.5 mmol) of 3,3′,4,4′-benzhydroltetracarboxylic acid dimethyl ester and 9.2 g (46.5 mmol) of bis(4-aminophenyl)methane in 30 ml of NMP are initially introduced into a 250 ml three-necked flask having a mechanical stirrer, nitrogen inlet and short distillation bridge with a thermometer, measuring vessel and drying tube, and are heated under nitrogen, and with vigorous stirring, at 170° to 180° C. for 2 hours and then at 195° to 200° C. for 4 hours.

The highly viscous polyimide solution thus obtained was diluted to about 15 to 20% by weight with NMP and then used for the subsequent reaction.

To determine the yield, the solution was washed with water and dried overnight at 130° C. under 0.5 torr (mm Hg).

Yield: 24.5 g (98% of theory)

Intrinsic viscosity: 0.87 dl/g (at 25° C. and a concentration of 0.5% in NMP)

Glass transition temperature: 263° C. and 306° C. (DSC)

Heat stability: 472° C., (TGA, 5% weight loss in air)

EXAMPLE 2

Preparation of a polyimide (IIa)

The preparation is carried out analogously to Example 1.

7.8 g (20 mmol) of 3,3′,4,4′-benzhydroltetracarboxylic acid dimethyl ester and 9.3 g (20 mmol) of 1,4-bis (4-aminophenylthio) diphenyl sulfone were employed.

Yield: 15.5 g (96.5% of theory)

Intrinsic viscosity: 0.52 dl/g (at 25° C., concentration of 0.5% in NMP)

Glass transition temperature: 243° C. (DSC)

Heat stability: 465° C. (TGA, 5% weight loss in air)

EXAMPLE 3

Preparation of a polyamide-imide (Ib)

The preparation was carried out analogously to Example 1.

9.0 g (23 mmol) of 3,3′,4,4′-benzhydroltetracarboxylic acid dimethyl ester, 4.5 g (23 mmol) of trimellitic acid anhydride chloride and 9.1 g (46 mmol) of bis(4-aminophenyl)methane were employed.

Yield: 19.9 g (98.3% of theory)

Intrinsic viscosity: 0.82 dl/g (at 25° C. and a concentration of 0.5% in NMP)

Glass transition temperature: 226° C. (DSC)

Heat stability: 438° C. (TGA, 5% weight loss in air)

EXAMPLE 4

Preparation of a polyamide-imide (IIb)

The preparation was carried out analogously to Example 1.

9.0 g (23 mmol) of 3,3′,4,4′-benzhydroltetracarboxylic acid dimethyl ester, 3.9 g (23 mmol) of isophthalic acid dichloride and 9.1 g (46 mmol) of bis(4aminophenyl)methane were employed.

Yield: 19.2 g (97.8% of theory)

Intrinsic viscosity: 0.95 dl/g (at 25° C. and a concentration of 0.5% in NMP)

Glass transition temperature: 217° C. (DSC)

Heat stability: 435° C. (TGA, 5% weight loss in air)

EXAMPLE 5

Esterification of polyimide Ia with acrylyl chloride 2 g of polyimide Ia (corresponds to about 4 mmol of OH groups), 4 mmol of pyridine and a spatula-tip of hydroquinone were dissolved in 35 ml of NMP under nitrogen in a 100 ml three-necked flask with a mechanical stirrer, nitrogen inlet, dropping funnel and drying tube, the mixture was cooled to about −5° C. with NaCl/ice and 0.36 g (4 mmol) of acrylyl chloride in 10 ml of NMP was added dropwise in the course of 30 minutes.

After about 1 hour, the cooling was removed and the reaction mixture was stirred at room temperature for a further 2 hours. It was then added dropwise, with a spatula-tip of hydroquinone, into 500 ml of ice-water, while stirring vigorously, and the product which had precipitated was filtered off, washed with water, methanol and acetone and freeze dried.

Yield: 2.2 g

Intrinsic viscosity: 0.9 dl/g (0.5% in NMP, 25° C.)

Glass transition temperature: 314° C.

Heat stability: 513° C.

Further esterifications were carried out analogously to Example 5. The amounts and products employed, yields, glass transition temperatures (Tg), intrinsic viscosities (i.v.) and heat stabilities (TGA) are summarized in Table 1.

TABLE 1

| Polymer/<br>acid chloride | Yield<br>(g) | i.v.<br>(dl/g) | Tg<br>(°C.) | TGA<br>(°C.) |
|---|---|---|---|---|
| Ia/methacrylyl chloride<br>(3 g/0.64 g) | 3.5 | 1.00 | 310 | 515 |
| Ia/acetyl chloride<br>(5 g/1.18 g) | 6.4 | 0.98 | 253 | 487 |
| Ia/benzoyl chloride<br>(2 g/0.7 g) | 2.5 | 0.61 | 280 | 477 |
| Ia/acrylyl chloride<br>(4 g/0.36 g) | 4.3 | 0.99 | 302 | 498 |
| Ia/acetyl chloride<br>(5 g/0.6 g) | 5.5 | 0.97 | 260 | 480 |
| IIa/cinnammyl chloride<br>(3.76 g/1.3 g) | 4.7 | 0.51 | 249 | 465 |
| IIa/lauryl chloride<br>(7.52 g/3.28 g) | 10.3 | 0.53 | 226 | 453 |
| IIa/crotonyl chloride<br>(6.0 g/1.05 g) | 6.8 | 0.50 | 240 | 475 |
| IIa/linolyl chloride<br>(3.76 g/2.24 g) | 5.9 | 0.61 | 218 | 415 |
| Ib/acetyl chloride<br>(8.4 g/1.18 g) | 9.2 | 0.75 | 233 | 445 |
| IIb/acetyl chloride<br>(8.14 g/1.18 g) | 8.5 | 0.90 | 228 | 451 |

What we claim is:

1. Heat-stable polyimides and polyamide-imides of the formula I

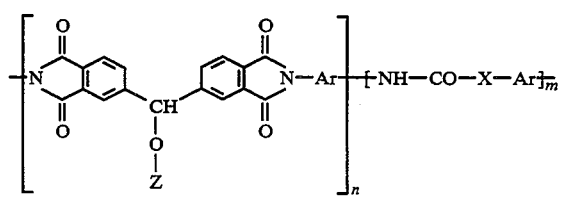

in which Ar denotes a divalent aromatic radical of the formula

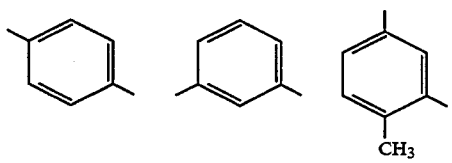

or mixtures thereof, wherein A represents —CH$_2$—, —C(CH$_3$)$_2$—, —O—, —S—, —SO$_2$—, —SO—, —CO—, —COO—, —CO—NH—, —NH—, —(N—alkyl) having 1 to 20 C atoms, —N=N—or

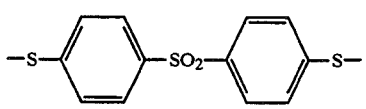

X denotes a radical of the formula

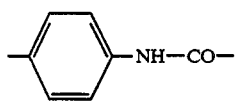

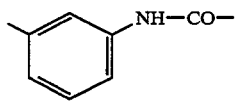 or 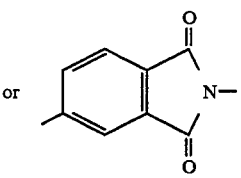

and Z is identical or different and denotes hydrogen, a straight-chain or branched, saturated or mono- or polyunsaturated acyl radical having 2 to 20 C atoms or an aroyl radical having 7 to 20 C atoms, which can optionally be substituted by halogen, with the proviso that Z is not hydrogen alone, and n denotes an integer from 2 to 100 and m denotes an integer from 0 to 100, and, in the case where m>1, the radical (—NH—CO—X—Ar—) is randomly distributed.

2. Heat-stable polyimides and polyamide-imides of the formula I in which Ar denotes a divalent aromatic radical of the formula

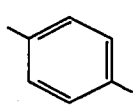 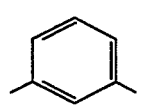 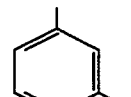

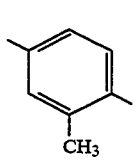 or 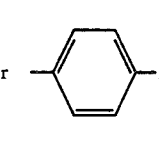

or mixtures thereof, wherein A represents —CH$_2$—, —C(CH$_3$)$_2$—, —O—, —S—, —SO$_2$—, —NH—or

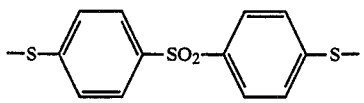

X, Z, n and m are as defined in claim 1.

3. Heat-stable polyimides and polyamide-imides of the formula I, in which Z is identical or different and denotes hydrogen, a straight-chain or branched, saturated or mono- or polyunsaturated acyl radical having 2 to 18 C atoms or an aroyl radical having 7 to 10 C atoms, with the proviso that Z is not hydrogen alone, and Ar, X, m and n are as defined in claim 1.

4. Heat-stable polyimides and polyamide-imides of the formula I in which Ar denotes a divalent aromatic radical of the formula

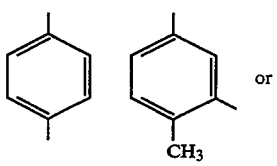 or

-continued

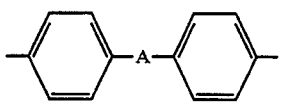

or mixtures thereof, wherein A represents —CH$_2$—, —C(CH$_3$)$_2$— or

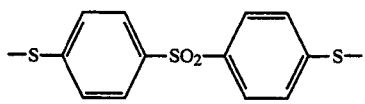

and X, Z, m and n are as defined in claim 1.

5. Heat-stable polyimides and polyamide-imides of the formula I in which Z denotes an acetyl, lauroyl, crotonyl, linoloyl, linolenoyl, benzoyl, phenylacetyl, acryloyl or methacryloyl radical, and Ar, X, m and n are as defined in claim 1.

6. A process for the preparation of heat-stable polyimides and polyamide-imides according to claim 1 wherein 3,3'4,4'-benzhydroltetracarboxylic acid dimethyl ester a) in the case where, in formula I, m=0, is reacted with diamines of the formula II NH$_2$—Ar—NH$_2$ (II)

in which Ar is as defined in claim 1, in a diluent which is inert under the reaction conditions, selected from the group consisting of N-methylpyrrolidone, dimethylformamide, dimethylacetamide, dimethylsulfoxide, tetramethylurea and hexamethylenphosphonic acid triamide at a temperature of 150° to 190° C. and the polyamide acid intermediately formed is cyclized chemically or thermally by heating at 190° to 220° C. or b) in the case where, in formula I, m>0, is reacted with diamines of the formula II NH$_2$—Ar—NH$_2$ (II)

in which Ar is as defined in claim 1, and with trimellitic acid, phthalic acid or isophthalic acid or anhydrides, anhydride chlorides, acid chlorides or esters thereof and the polyamide-imide acid intermediately formed cyclized chemically or thermally, and the polyamide-imides obtained of the formula III

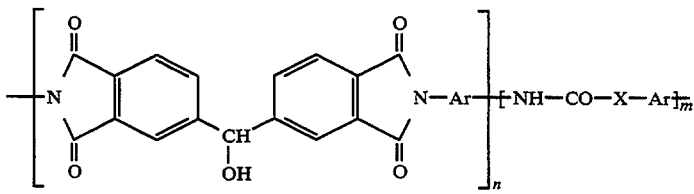

in which Ar, X, n and m are as defined in claim 1, are then reacted with acid chlorides or acid anhydrides of the formula Z'—Cl (IVa)

or

Z'—O—Z' (IVb)

which Z' is identical or different and denotes a straight-chain or branched, saturated or mono- or polyunsaturated acyl radical having 2 to 20 C atoms or an aroyl radical having 7 to 20 C atoms, which can optionally be substituted by halogen, first at −10° to 0° C. and then at room temperature in a diluent as defined above to give the compounds of formula I.

* * * * *